(12) United States Patent
Kaikkonen et al.

(10) Patent No.: US 7,864,738 B2
(45) Date of Patent: Jan. 4, 2011

(54) APPARATUS, METHOD AND COMPUTER PROGRAM PRODUCT PROVIDING HYBRID ARQ FEEDBACK FOR HSDPA MIMO

(75) Inventors: Jorma Kaikkonen, Oulu (FI); Marko Lampinen, Oulo (FI)

(73) Assignee: Nokia Corporation, Espoo (FI)

( * ) Notice: Subject to any disclaimer, the term of this patent is extended or adjusted under 35 U.S.C. 154(b) by 615 days.

(21) Appl. No.: 11/906,434

(22) Filed: Oct. 2, 2007

(65) Prior Publication Data

US 2008/0144561 A1 Jun. 19, 2008

Related U.S. Application Data

(60) Provisional application No. 60/849,497, filed on Oct. 2, 2006.

(51) Int. Cl.
*H04W 4/00* (2009.01)

(52) U.S. Cl. .......................... 370/334; 370/315; 375/229

(58) Field of Classification Search ................. 370/334, 370/315, 319, 329, 331, 332; 375/229–236, 375/240.07, 240.05
See application file for complete search history.

(56) References Cited

U.S. PATENT DOCUMENTS

| 7,760,812 B2 * | 7/2010 | Liu et al. .................... 375/260 |
| 2003/0079169 A1 | 4/2003 | Ho et al. .................... 714/748 |
| 2005/0181811 A1 * | 8/2005 | Magnusson et al. ......... 455/458 |
| 2006/0093065 A1 | 5/2006 | Thomas et al. .............. 375/299 |
| 2008/0117843 A1 * | 5/2008 | Ishii et al. ................... 370/310 |
| 2008/0301515 A1 * | 12/2008 | Sagfors et al. ............. 714/748 |

FOREIGN PATENT DOCUMENTS

WO   WO-2005/046113 A2   5/2005

OTHER PUBLICATIONS

"3$^{rd}$ Generation Partnership Project; Technical Specification Group Radio Access Network; Multiplexing and channel coding (FDD) (Release 7)", 3GPP TS 25.212 V7.1.0 (Jun. 2006), pp. 1-84.

(Continued)

*Primary Examiner*—Ricky Ngo
*Assistant Examiner*—Gary Mui
(74) *Attorney, Agent, or Firm*—Harrington & Smith (57) ABSTRACT

A method includes generating automatic repeat request feedback information at a first device in response to a downlink transmission from a second device; encoding the feedback information to comprise an indication of a number of streams received in the downlink transmission and transmitting encoded feedback information to the second device. Another method includes transmitting a multi-stream downlink transmission from a first device to a second device; receiving encoded hybrid automatic repeat request feedback information from the second device; decoding the received hybrid automatic repeat request feedback information at the first device; and determining from the encoding of the hybrid automatic repeat request feedback information at least a number of streams that were actually received by the device from the downlink transmission. A wireless link between the devices can be a 2×2 MIMO link. Also disclosed are memory mediums for storing program instructions to implement the methods, and apparatus including user equipment and base stations constructed to carry out the methods.

25 Claims, 3 Drawing Sheets

OTHER PUBLICATIONS

3rd Generation Partnership Project; Technical Specification Group Radio Access Network; Physical channels and mapping of transport channels onto physical channels (FDD) (Release 7), 3GPP TS 25.211 V7.0.0 (Mar. 2006), pp. 1-50.

"HS-DPCCH in support of D-TxAA", 3GPP TSG-RAN WG1 #46, T1-062031, Aug. 28-Sep. 1, 2006, pp. 1-13.

"ACK/NACK coding", 3GPP TSG-RAN WG1, MIMO R7, R1-MIMOR7-QCOM-09, Sep. 27, 2006, pp. 1-2.

3GPP TSG-RAN WG1 #46, R1-062437, Philips, Qualcomm, Nortel, Ericsson, Motorola, TI, Lucent, Nokia, T-Mobile, ArrayComm, "Agreements on details in support of MIMO (FDD) for Rel-7", Tallin, Estonia, Aug. 28-Sep. 1, 2006, pp. 1-3, XP002478852.

* cited by examiner

FIG.1

APPARATUS, METHOD AND COMPUTER PROGRAM PRODUCT PROVIDING HYBRID ARQ FEEDBACK FOR HSDPA MIMO

CLAIM OF PRIORITY FROM COPENDING PROVISIONAL PATENT APPLICATION

This patent application claims priority under 35 U.S.C. §119(e) from Provisional Patent Application No. 60/849,497, filed Oct. 2, 2006, the disclosure of which is incorporated by reference herein in its entirety.

TECHNICAL FIELD

The exemplary and non-limiting embodiments of this invention relate generally to wireless communication systems, methods, devices and computer program products and, more specifically, relate to techniques that provide feedback related to hybrid automatic repeat request.

BACKGROUND

The following abbreviations are herewith defined:

3GPP third generation partnership project

ACK acknowledge

ARQ automatic repeat request.

CQI channel quality indication

DL downlink (Node-B to UE)

DTX discontinuous transmission

FDD frequency division duplex

HARQ hybrid ARQ

HSDPA high speed downlink packet access

HS-DPCCH high speed dedicated physical control channel

HS-DSCH high speed downlink shared channel

HS-PDSCH high speed physical downlink shared channel

HS-SCCH shared control channel for HS-DSCH

MCS modulation and coding scheme

MIMO multiple input multiple output

NACK not acknowledge, negative acknowledge

Node-B base station

UE user equipment

UL uplink (UE to Node-B)

UMTS universal mobile telephony system

UTRA UMTS terrestrial radio access

3GPP RAN1 meeting #45 8.-12.5.2006 agreed to recommend specifying a 2×2 (dual transmit—dual receive antenna—dual code word) MIMO technique for HSDPA.

As is known in the art, MIMO only provides gains in good channel conditions, and thus a single stream transmission should be applied when the channel conditions are less than what will provide an adequate MIMO dual-stream transmission.

In addition to dual stream transmission the selected MIMO scheme was determined to be a dual code word system. This implies that each of the streams should have independent HARQ operation.

The HSDPA delivers downlink HARQ feedback (ACK/NACKs) in the UL on a HS-DPCCH physical channel for use by a Node-B packet scheduler. Based on the provided feedback Node-B the scheduler makes decisions whether to perform re-transmissions for the failed transmission or whether to transmit a new packet for each stream separately.

Referring to 3GPP TS25.212, V7.1.0 (2006-06), 3rd generation Partnership Project; Technical Specification Group Radio Access Network; Multiplexing and channel coding (FDD) (Release 7), section 4.7.1.1 describes the HARQ feedback as a 1-bit indication (ACK/NACK) that is (10,1) repetition coded.

Referring to 3GPP TS25.211, V7.0.0 (2006-06), 3rd generation Partnership Project; Technical Specification Group Radio Access Network; Physical channels and mapping of transport channels onto physical channels (FDD) (Release 7), section 5.2.1.2 "HS-DPCCH" defines the HS-DPCCH channel structure for delivering the coded bits to the Node-B in the UL.

Figure 2A:
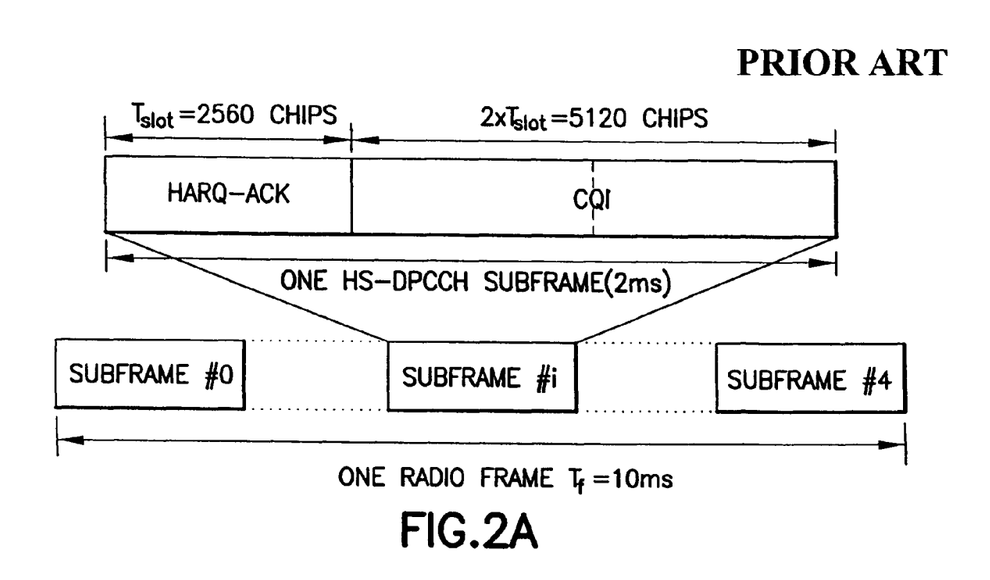
FIG. 2A reproduces FIG. 2A of 3GPP TS25.211, V7.0.0 (2006-06), and shows the frame structure for the uplink HS-DPCCH.

As is described in section 5.2.1.2, the frame structure of the HS-DPCCH is defined in FIG. 2A (shown herein also as FIG. 2A). The HS-DPCCH carries uplink feedback signaling related to downlink HS-DSCH transmission. The HS-DSCH-related feedback signaling consists of Hybrid-ARQ Acknowledgment (HARQ-ACK) and Channel-Quality Indication (CQI). Each sub-frame of length 2 ms (3*2560 chips) consists of 3 slots, each of length 2560 chips. The HARQ-ACK is carried in the first slot of the HS-DPCCH sub-frame. The CQI is carried in the second and third slot of a HS-DPCCH sub-frame. There is at most one HS-DPCCH on each radio link. The HS-DPCCH can only exist together with an uplink DPCCH. The timing of the HS-DPCCH relative to the uplink DPCCH is shown in section 7.7 of 3GPP TS25.211.

Figure 2B:
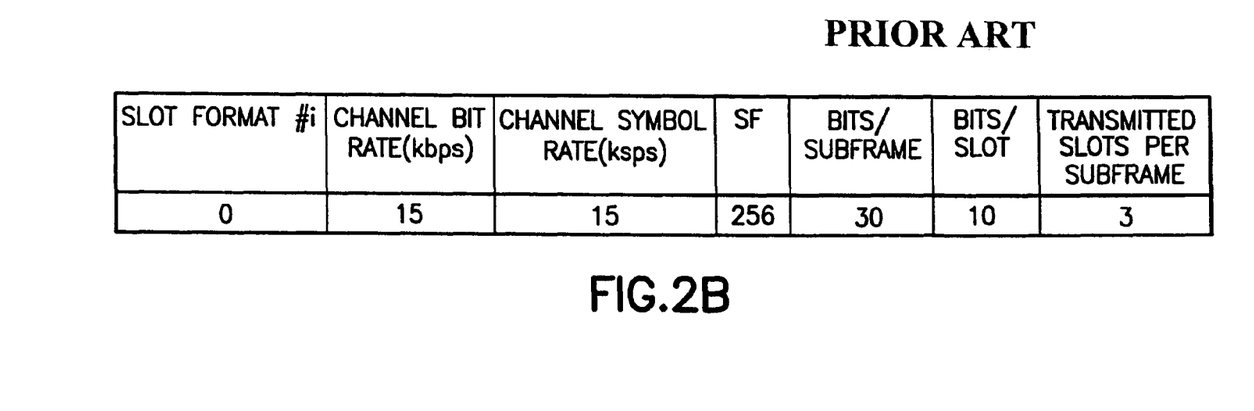
FIG. 2B reproduces Table 5A of 3GPP TS25.211, V7.0.0 (2006-06), and shows the fields of the HS-DPCCH.

The spreading factor of the HS-DPCCH is 256. i.e., there are 10 bits per uplink HS-DPCCH slot. The slot format for the uplink HS-DPCCH is defined in Table 5A, shown herein as FIG. 2B.

There is at least one inherent potential problem in the functioning of HARQ signaling. More specifically, the HS-DSCH transmission to a UE is indicated on the HS-SCCH. The HS-SCCH signaling for MIMO also indicates the number of applied streams. If the number of streams is detected incorrectly by the UE due to some reception error, the HARQ feedback in UL will reflect this reception error. In this case the UE would provide the HARQ feedback assuming wrong number of streams/code words. The Node-B might not have a means to detect such errors correctly unless the encoding of the HARQ feedback is designed to support that.

For example, if independent HS-SCCH signaling is provided for each HS-PDSCH (e.g., for each stream), the UE may detect only one HS-SCCH correctly. In such a case the UE would report a single ACK/NACK based on the detected stream.

If the Node-B is unable to detect this situation where the UE erroneously assumes only a single stream being transmitted, then unnecessary higher layer re-transmissions may occur since a detection miss would be erroneously interpreted as an ACK.

R1-062031, "HS-DPCCH in support of D-TxAA", August 28th-September 1st, Qualcomm Europe, makes a proposal that assumes two independent ACK/NACKs (for each stream), or only a single ACK/NACK. However, no indication on the number of streams received is provided.

Reference can also be made to 3GPP TSG-RAN WG1, MIMO R7, Teleconference, Sep. 27, 2006, R1-MIMOR7-QCOM-09, ACK/NACK coding, Qualcomm Europe, which suggests the use of two separate (5,1) repetition block codes on the first ten bits of a HS-DPCCH TTI, and possibly interleaving the two blocks of (5,1) repetition codes.

SUMMARY OF THE EXEMPLARY EMBODIMENTS OF THIS INVENTION

The foregoing and other problems are overcome, and other benefits are realized by the use of the exemplary embodiments of this invention.

In a first aspect thereof the exemplary embodiments of this invention pertain to a method, that includes generating automatic repeat request feedback information at a first device in response to a downlink transmission from a second device; encoding the feedback information to comprise an indication of a number of streams received in the downlink transmission and transmitting encoded feedback information to the second device.

In a further aspect thereof the exemplary embodiments of this invention pertain to a memory medium that stores computer program instructions the execution of which results in operations that comprise generating automatic repeat request feedback information at a first device in response to a downlink transmission from a second device; encoding the feedback information to comprise an indication of a number of streams received in the downlink transmission and transmitting encoded feedback information to the second device.

In another aspect thereof the exemplary embodiments of this invention pertain to an apparatus that includes a receiver configurable to receive a downlink transmission from a device; a feedback generator configurable to generate hybrid automatic repeat request feedback information in response to the received downlink transmission; an encoder configurable to encode the generated hybrid automatic repeat request feedback information to comprise an indication of a number of streams received in the downlink transmission; and a transmitter configurable to transmit the encoded hybrid automatic repeat request feedback information to the device.

In a still further aspect thereof the exemplary embodiments of this invention pertain to a method that comprises transmitting a multi-stream downlink transmission from a first device to a second device; receiving encoded hybrid automatic repeat request feedback information from the second device; decoding the received hybrid automatic repeat request feedback information at the first device and determining, from the encoding of the hybrid automatic repeat request feedback information, at least a number of streams that were actually received by the device from the downlink transmission.

In another aspect thereof the exemplary embodiments of this invention pertain to an apparatus that comprises a transmitter configurable to transmit a multi-stream downlink transmission to a receiving device; a receiver configurable to receive encoded hybrid automatic repeat request feedback information from the receiving device; a decoder configurable to decode the received hybrid automatic repeat request feedback information and a data processor that is coupled to said decoder and configurable by execution of computer program instructions to determine, from the encoding of the hybrid automatic repeat request feedback information, at least a number of streams that were actually received by the receiving device from the downlink transmission.

DETAILED DESCRIPTION

Figure 1:
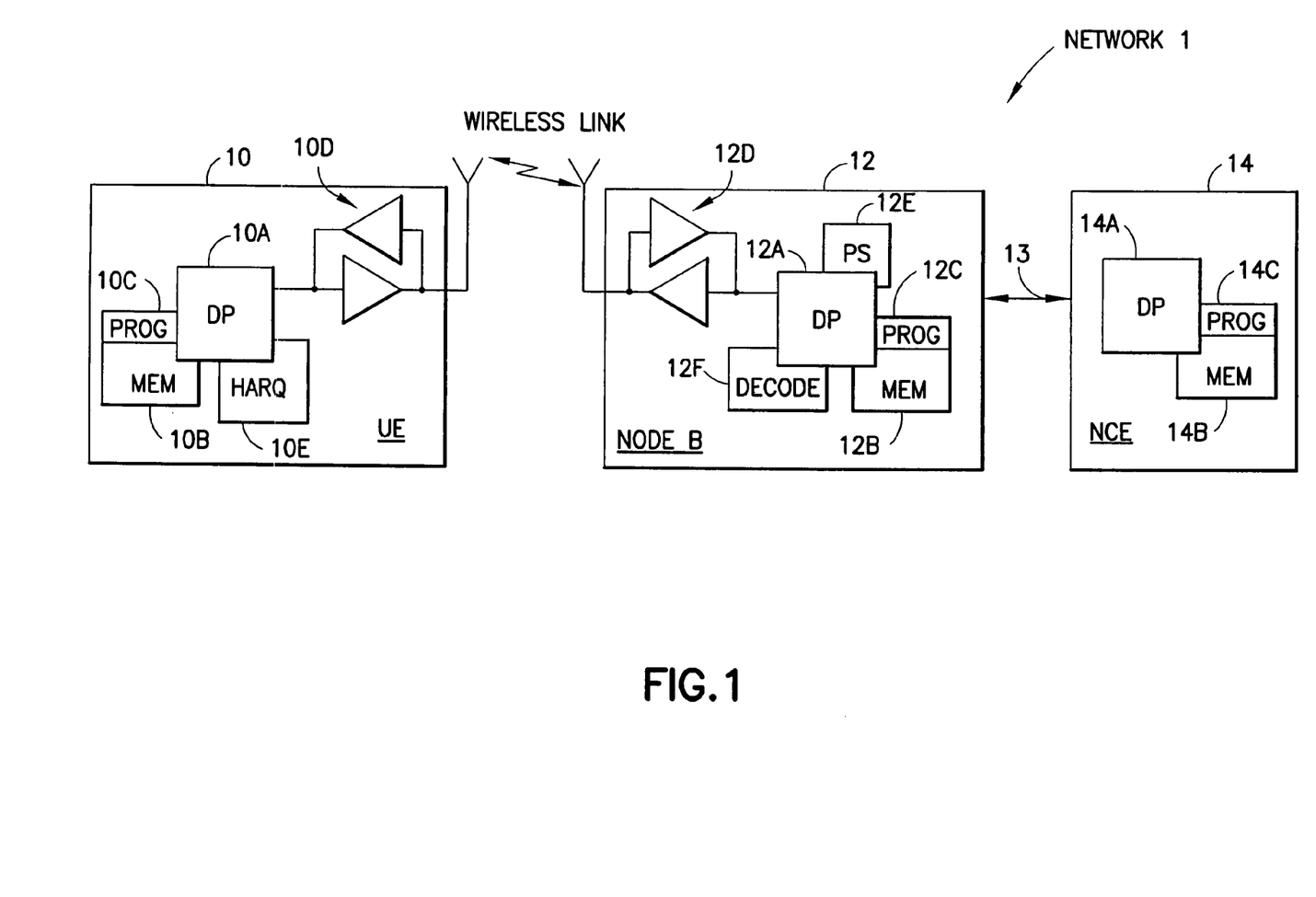
FIG. 1 shows a simplified block diagram of various electronic devices that are suitable for use in practicing the exemplary embodiments of this invention.

Reference is made first to FIG. 1 for illustrating a simplified block diagram of various electronic devices that are suitable for use in practicing the exemplary embodiments of this invention. In FIG. 1 a wireless network 1 is adapted for communication with a UE 10 via a Node B (base station) 12. The network 1 may include a network control element NCE 14. The UE 10 includes a data processor (DP) 10A, a memory (MEM) 10B that stores a program (PROG) 10C, and a suitable radio frequency (RF) transceiver 10D for bidirectional wireless communications with the Node B 12, which also includes a DP 12A, a MEM 12B that stores a PROG 12C, and a suitable RF transceiver 12D. The wireless link transmissions between the UE 10 and the Node-B 12 are assumed to conform to the 2×2 multi-antenna MIMO scheme, and thus there may actually be multiple transmit and receive antennas at each end of the link. The Node B 12 is coupled via a data path 13 to the NCE 14 that also includes a DP 14A and a MEM 14B storing an associated PROG 14C. The PROGs 10C and 12C are assumed to include program instructions that, when executed by the associated DP, enable the electronic device to operate in accordance with the exemplary embodiments of this invention, as will be discussed below in greater detail.

Relatedly, also shown in FIG. 1 is a HARQ unit 10E at the UE 10 and a packet scheduler (PS) unit 12D and HARQ information decoder 12F at the Node-B 12. These units operate in accordance with the exemplary embodiments of this invention, as will be discussed below in greater detail.

In general, the exemplary embodiments of this invention may be implemented by computer software executable by the DP 10A of the UE 10 and the DP 12A of the Node-B 12, or by hardware, or by a combination of software and hardware.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

In accordance with the exemplary embodiments of this invention certain information that specifies the number of streams received (and actually detected) by the UE 10 is included in the HARQ feedback to the Node-B 12. This beneficially enables the Node-B 12 to unambiguously distinguish dual stream ACK/NACK signaling from only single stream ACK/NACK signaling in accordance with the encoding of the HARQ feedback information.

To achieve this it is preferred that the UL HARQ feedback is encoded by the HARQ unit 10E in such a way that the single stream and dual stream cases can be decoded unambiguously at the Node-B 12 by the decoder 12F, such as by the use of separate code words, single stream and dual stream cases.

As one non-limiting example of providing the HARQ feedback with code word information, effectively six code words are selected from a 10-bit long sequence to produce a code. The information fields are: A, N, AA, AN, NA, NN, i.e., all possible combinations of single stream (the first two fields) and dual stream (the remaining four fields) ACK (A) and NACK (N).

To further refine the code structure, the codewords may be selected so that the probability of occurrence of undesired error events is reduced by, for example, optimizing the Hamming distances between the code words.

As another non-limiting example of providing the HARQ feedback with code word information, the ACK and NACK indications for each stream are encoded by, for example, a (5,1) block code or repetition code, and DTX is used on an unused part of the message, i.e., if only single stream is received. That is, the other information field would be subject to DTX if UE 10 assumes that it has been only allocated a single stream. In this case, and by example, the code words may be: AX, NX, AA, AN, NA, NN where X indicates DTX in the bit field.

With regard to the foregoing note that one suitable and non-limiting generation matrix may be simply: G=(11111). The repetition code may be quite simple, such as by repeating either the 1 or 0. The use of block and repetition codes, and codecs therefor, per se is well known, and not further described herein.

As should be appreciated, by thus indicating the number of detected streams/code words in the HARQ feedback more reliable HARQ feedback signaling can be provided, thereby reducing or eliminating an occurrence of higher layer re-transmissions to the UE 10.

Based on the foregoing it should be apparent that the exemplary embodiments of this invention provide methods, apparatus and computer program product(s) to indicate a number of detected streams in HARQ feedback to the Node-B 12.

Figure 3:
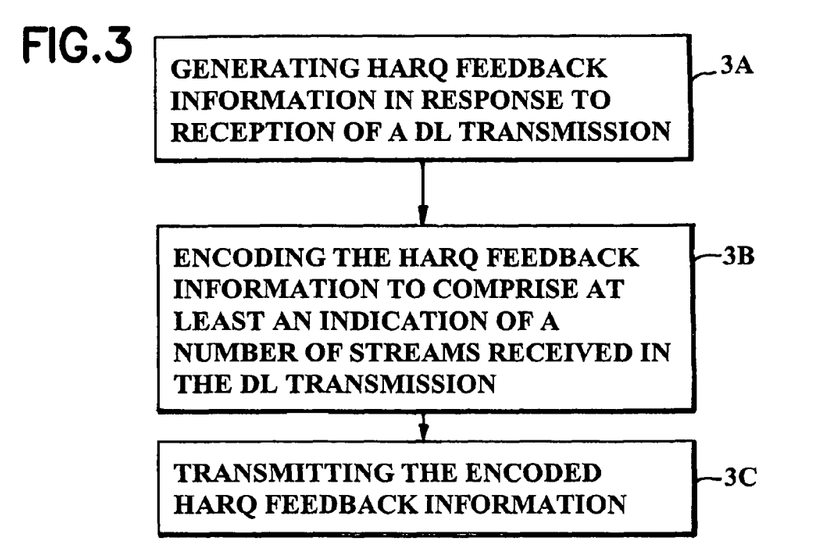
FIG. 3 is a logic flow diagram that is descriptive of the operation of a method, and a computer program product, of the UE shown in FIG. 1.

Referring now to FIG. 3, a method and computer program product executed by a first device operates in response to a DL transmission from a second device to generate HARQ feedback information (Block 3A), to encode the HARQ feedback information to comprise (at least) an indication of a number of streams received in the DL transmission (Block 3B), and to transmit the encoded HARQ feedback information to the second device (Block 3C).

In the method and computer program product, there are a maximum of two streams, and where encoding the HARQ feedback information comprises selecting a code word from a plurality of code words, e.g., from six code words: A, N, AA, AN, NA, NN, thereby providing all possible combinations of single stream and two stream ACK (A) and NACK (N) information.

In the method and computer program product, there are a maximum of two streams, and where encoding the HARQ feedback information comprises using one of a (5,1) block code or a repetition code, and using DTX on an unused part of the message to provide the code word: AX, NX, AA, AN, NA, NN providing all possible combinations of single stream and two stream ACK (A) and NACK (N) information, where X indicates DTX in the bit field.

In the method and computer program product of the previous three paragraphs, where the DL transmission is received from a HS-DSCH by a UE, and where the encoded HARQ feedback information is sent to a Node-B on a HS-DPCCH.

In the method and computer program product of the previous four paragraphs, where a wireless link between the first and second devices comprises a 2×2 MIMO wireless link.

Also disclosed is a first device comprising a HARQ unit operable in response to a reception of DL transmission from a second device to generate HARQ feedback information that is encoded to comprise an indication of a number of streams received in the DL transmission. The HARQ unit has an output coupled to a transmitter for providing the encoded HARQ feedback information for transmission to the second device.

In the first device of the previous paragraph there are a maximum of two streams, and the HARQ feedback information is encoded by selecting a code word from a plurality of code words: A, N, AA, AN, NA, NN, providing all possible combinations of single stream and two stream ACK (A) and NACK (N) information.

In the first device there are a maximum of two streams, and the HARQ feedback information is encoded using one of a (5,1) block code or a repetition code, and by using DTX on an unused part of the message to provide the code word: AX, NX, AA, AN, NA, NN providing all possible combinations of single stream and two stream ACK (A) and NACK (N) information, where X indicates DTX in the bit field.

In the first device of the previous three paragraphs, the DL transmission is received from a HS-DSCH, and the encoded HARQ feedback information is sent to a Node-B on a HS-DPCCH.

In the first device of the previous four paragraphs, a wireless link between the first and second devices comprises a 2×2 MIMO wireless link.

Figure 4:
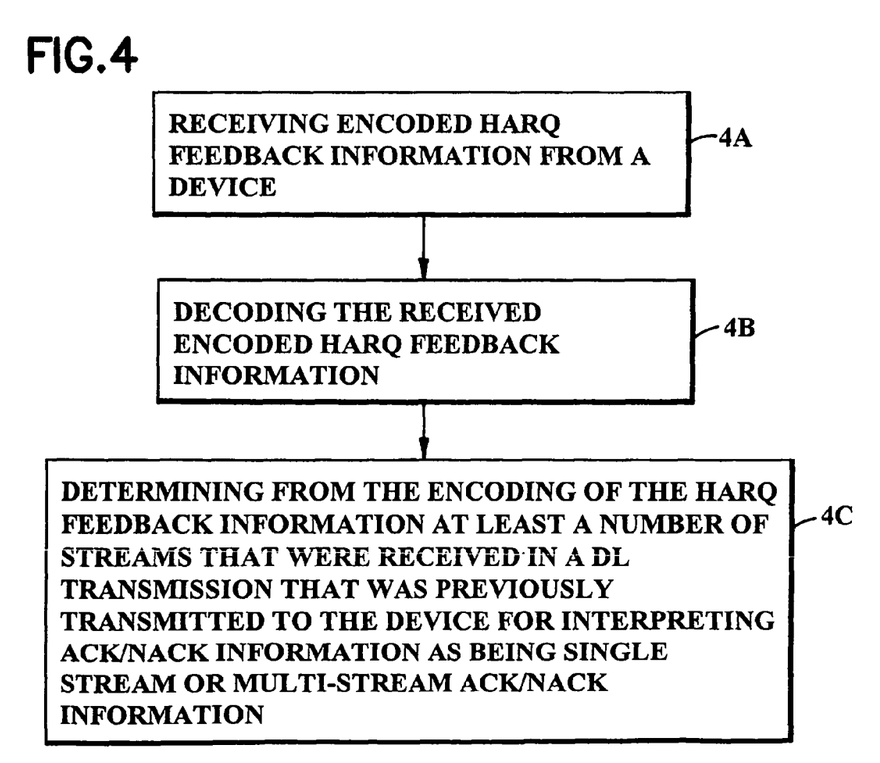
FIG. 4 is a logic flow diagram that is descriptive of the operation of a method, and a computer program product, of the Node-B shown in FIG. 1.

Referring now to FIG. 4, a method and computer program product executed by a first device operates to receive encoded HARQ feedback information from a second device (Block 4A), to decode the received encoded HARQ feedback information (Block 4B), and to determine from the encoding of the HARQ feedback information at least a number of streams that were received in a DL transmission that was previously transmitted to the second device (Block 4C).

In the method and computer program product of the previous paragraph there are a maximum of two streams, and where the received HARQ feedback information is encoded by selecting a code word from a plurality of code words: A, N, AA, AN, NA, NN, providing all possible combinations of single stream and two stream ACK (A) and NACK (N) information.

In the method and computer program product, there are a maximum of two streams, and where the received HARQ feedback information is encoded using one of a (5,1) block code or a repetition code, and is sent using DTX on an unused part of the message to provide the code word: AX, NX, AA, AN, NA, NN providing all possible combinations of single stream and two stream ACK (A) and NACK (N) information, where X indicates DTX in the bit field.

In the method and computer program product of the previous three paragraphs, where the DL transmission is received from a HS-DSCH by a UE, and where the encoded HARQ feedback information is received by a Node-B on a HS-DPCCH.

In the method and computer program product of the previous four paragraphs, where a wireless link between the first and second devices comprises a 2×2 MIMO wireless link.

Also disclosed is a Node-B that comprises a receiver to receive encoded HARQ feedback information from a UE, a decoder to decode the received encoded HARQ feedback information, and a determination unit to determine from the encoding of the HARQ feedback information at least a number of streams that were received in a DL transmission that was previously transmitted to the UE (Block 4C).

The various blocks shown in FIGS. 3 and 4 may be viewed as method steps, and/or as operations that result from operation of computer program code, and/or as a plurality of coupled logic circuit elements constructed to carry out the associated function(s).

The encoded code word in these various embodiments includes information on the number of code words (and the number of received streams) and HARQ ACK/NACK, and one code word is transmitted from the allowed set of code words.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   generating automatic repeat request feedback information at a first device in response to a downlink transmission on one or more streams from a second device;
   encoding the automatic repeat request feedback information so as to comprise an indication of a number of the one or more streams actually received in the downlink transmission; and
   transmitting encoded automatic repeat request feedback information to the second device.

2. The method of claim 1, where there are two streams, and where encoding the feedback information comprises selecting a code word from a plurality of code words comprising A, N, AA, AN, NA, and NN, thereby including possible combinations of single stream and two stream acknowledge (A) and negative acknowledge (N) information.

3. The method of claim 1, where there are two streams, and where encoding the feedback information comprises using one of a (5,1) block code or a repetition code, and using discontinuous transmission DTX on an unused part of a message to provide the code word: AX, NX, AA, AN, NA, or NN, thereby providing possible combinations of single stream and two stream acknowledge (A) and negative acknowledge (N) information, where X indicates DTX in a bit field.

4. The method of claim 1, where the downlink transmission is received from a high speed downlink shared channel, and where the encoded automatic repeat request feedback information is transmitted to the second device on a high speed dedicated physical control channel.

5. The method of claim 1, where a wireless link between the first and second devices comprises a 2×2 multiple input multiple output wireless link.

6. A memory medium that stores computer program instructions the execution of which results in operations that comprise:
   generating automatic repeat request feedback information at a first device in response to a downlink transmission on one or more streams from a second device;
   encoding the automatic repeat request feedback information so as to comprise an indication of a number of the one or more streams actually received in the downlink transmission; and
   transmitting encoded automatic repeat request feedback information to the second device.

7. The memory medium of claim 6, where there are two streams, and where the operation of encoding the feedback information comprises selecting a code word from a plurality of code words comprising A, N, AA, AN, NA, and NN, thereby providing possible combinations of single stream and two stream acknowledge (A) and negative acknowledge (N) information.

8. The memory medium of claim 6, where there are two streams, and where the operation of encoding the feedback information comprises using one of a (5,1) block code or a repetition code, and using discontinuous transmission DTX on an unused part of a message to provide the code word: AX, NX, AA, AN, NA, or NN, thereby providing possible combinations of single stream and two stream acknowledge (A) and negative acknowledge (N).

9. The memory medium of claim 6, where the downlink transmission is received from a high speed downlink shared channel, and where the operation of transmitting the encoded automatic repeat request feedback information to the second device uses a high speed dedicated physical control channel.

10. The memory medium of claim 6, where a wireless link between the first and second devices comprises a 2×2 multiple input multiple output wireless link.

11. An apparatus, comprising:
a receiver configurable to receive a downlink transmission on one or more streams from a device;
a feedback generator configurable to generate hybrid automatic repeat request feedback information in response to the received downlink transmission;
an encoder configurable to encode the generated hybrid automatic repeat request feedback information so as to comprise an indication of a number of the one or more streams actually received in the downlink transmission; and
a transmitter configurable to transmit the encoded hybrid automatic repeat request feedback information to the device.

12. The apparatus of claim 11, where there are two streams, and where said encoder selects a code word from a plurality of code words comprising A, N, AA, AN, NA, and NN, thereby providing possible combinations of single stream and two stream acknowledge (A) and negative acknowledge (N) information.

13. The apparatus of claim 11, where there are two streams, and where said encoder uses one of a (5,1) block code or a repetition code and discontinuous transmission DTX on an unused part of a message to provide the code word: AX, NX, AA, AN, NA, or NN, thereby providing possible combinations of single stream and two stream acknowledge (A) and negative acknowledge (N) information, where X indicates DTX in a bit field.

14. The apparatus of claim 11, where said receiver receives the downlink transmission from a high speed downlink shared channel, and where said transmitter transmits the encoded hybrid automatic repeat request feedback information over a high speed dedicated physical control channel.

15. The apparatus of claim 11, where said transmitter and said receiver are operable with a 2×2 multiple input multiple output wireless link.

16. The apparatus of claim 11, where one or more of said receiver, said feedback generator, said encoder and said transmitter are embodied in at least one integrated circuit.

17. A method, comprising:
transmitting one or more streams in a downlink transmission from a first device to a second device;
receiving encoded hybrid automatic repeat request feedback information from the second device;
decoding the received hybrid automatic repeat request feedback information at the first device; and
determining from the encoding of the hybrid automatic repeat request feedback information at least a number of the one or more transmitted streams that were actually received by the second device from the downlink transmission.

18. The method of claim 17, where there are two streams, where the hybrid automatic repeat request feedback information is received encoded by a code word selected from a plurality of code words comprising A, N, AA, AN, NA, and NN, and where determining considers combinations of single stream and two stream acknowledge (A) and negative acknowledge (N) information.

19. The method of claim 17, where there are two streams, where the hybrid automatic repeat request feedback information is received encoded using one of a (5,1) block code or a repetition code, where discontinuous transmission DTX is used on an unused part of a message, to provide the code word: AX, NX, AA, AN, NA, or NN, and where determining considers possible combinations of single stream and two stream acknowledge (A) and negative acknowledge (N) information, where X indicates DTX in a bit field.

20. The method of claim 17, where the downlink transmission is sent over a high speed downlink shared channel, and where the encoded hybrid automatic repeat request feedback information is received from a high speed dedicated physical control channel.

21. The method of claim 17, where a wireless link between the first device and the second device comprises a 2×2 multiple input multiple output wireless link.

22. The method of claim 17, the method performed by execution of computer program instructions by a data processor, wherein the computer program instructions are stored in a memory medium of a base station.

23. An apparatus, comprising:
a transmitter configurable to transmit one or more streams in a downlink transmission to a receiving device;
a receiver configurable to receive encoded hybrid automatic repeat request feedback information from the receiving device;
a decoder configurable to decode the received hybrid automatic repeat request feedback information; and
a data processor coupled to said decoder and configurable by execution of computer program instructions to determine, from the encoding of the hybrid automatic repeat request feedback information, at least a number of the one or more transmitted streams that were actually received by the receiving device from the downlink transmission.

24. The apparatus of claim 23, where the downlink transmission is sent over a high speed downlink shared channel, where the encoded hybrid automatic repeat request feedback information is received from a high speed dedicated physical control channel, where a wireless link between the apparatus and the receiving device comprises a 2×2 multiple input multiple output wireless link, where there are two streams, where the hybrid automatic repeat request feedback information is received encoded by a code word selected from a plurality of code words comprising A, N, AA, AN, NA, and NN, and where said data processor considers possible combinations of single stream and two stream acknowledge (A) and negative acknowledge (N) information.

25. The apparatus of claim 23, where the downlink transmission is sent over a high speed downlink shared channel, where the encoded hybrid automatic repeat request feedback information is received from a high speed dedicated physical control channel, where a wireless link between the apparatus and the receiving device comprises a 2×2 multiple input multiple output wireless link, where there are two streams, where the hybrid automatic repeat request feedback information is received encoded using one of a (5,1) block code or a repetition code, where discontinuous transmission DTX is used on an unused part of a message, to provide the code word: AX, NX, AA, AN, NA, or NN, and where said data processor considers possible combinations of single stream and two stream acknowledge (A) and negative acknowledge (N) information, where X indicates DTX in a bit field.

* * * * *

UNITED STATES PATENT AND TRADEMARK OFFICE
CERTIFICATE OF CORRECTION

PATENT NO. : 7,864,738 B2
APPLICATION NO. : 11/906434
DATED : January 4, 2011
INVENTOR(S) : Kaikkonen et al.

It is certified that error appears in the above-identified patent and that said Letters Patent is hereby corrected as shown below:

Claim 8, col. 8, line 65 insert --information, where X indicates DTX in a bit field-- at the end of the sentence after "(N)".

Signed and Sealed this
Fifteenth Day of March, 2011

David J. Kappos
*Director of the United States Patent and Trademark Office*